United States Patent [19]

Tanaka et al.

[11] Patent Number: 4,696,866

[45] Date of Patent: Sep. 29, 1987

[54] FIBER REINFORCED METAL COMPOSITE MATERIAL

[75] Inventors: Atsuo Tanaka; Tadashi Dohnomoto, both of Toyota, Japan

[73] Assignee: Toyota Jidosha Kabushiki Kaisha, Toyota, Japan

[21] Appl. No.: 803,297

[22] Filed: Dec. 2, 1985

[30] Foreign Application Priority Data

Jan. 21, 1985 [JP] Japan .................................... 60-8894

[51] Int. Cl.[4] ........................ B32B 5/02; B32B 15/20; C22C 1/09; C22F 1/04; F01D 5/28

[52] U.S. Cl. .................................. 428/614; 29/527.4; 148/3; 148/11.5 Q; 148/437; 164/97; 164/98; 415/200; 416/229 R; 416/230; 420/548; 428/621; 428/654

[58] Field of Search ............... 428/303, 331, 654, 614; 164/97, 98; 29/527.4; 415/200

[56] References Cited

U.S. PATENT DOCUMENTS 4,444,603 4/1984 Yamatsuta et al. ................. 428/614
4,452,865 6/1984 Yamatsuta et al. ................. 428/614

FOREIGN PATENT DOCUMENTS 93837 6/1983 Japan .

*Primary Examiner*—James C. Cannon
*Attorney, Agent, or Firm*—Oblon, Fisher, Spivak, McClelland, & Maier

[57] ABSTRACT

The fiber reinforced metal composite material according to this invention provides a composite material comprising, in combination, alumina-fibers or alumina-silica fibers excellent in abrasion resistance, heat resistance and seizure resistance and hypereutectic aluminum-silicon-type alloys enriched with proeutectic silicon which is hard grains.

6 Claims, 11 Drawing Figures

FIBER REINFORCED METAL COMPOSITE MATERIAL

BACKGROUND OF THE INVENTION

1. Field of the Invention

This invention concerns a fiber reinforced metal composite material which has a reduced thermal expansion coefficient while retaining good abrasion resistance and heat resistance. Applications of this invention include compressor and engine parts, for example, vanes, rotors, swash plates and other parts of a compressor, parts of the pistons of an engine and the liners in engines or compressors.

2. Discussion of the Prior Art

Hyper-eutectic aluminum-silicon-type alloys comprising primary crystal silicon have hitherto been used in materials requiring abrasion resistance, heat resistance and a low thermal expansion coefficient, in addition to reduced-weight. However, although it is considerably low, the thermal expansion coefficient of the hyper-eutectic aluminum-silicon-type alloys is about $18\times10^{-6}$/°C. Therefore, they have not always been satisfactory when used as components for compressor vanes etc., particularly, those requiring a low thermal expansion coefficient. In view of the above, it has been contemplated, in recent years, to manufacture these parts with fiber-reinforced metal composite materials having abrasion resistance and a low thermal expansion coefficient, that is, composite materials in which JISAC8A aluminum alloy (A1-12%Si-1%Cu-2%Ni) is reinforced with alumina-silica fibers, where this composite material is excellent in abrasion resistance, heat resistance and seizure resistance to suppress the thermal expansion by the fibers (refer to composite material disclosed in Japanese Patent Laid-Open No. 93837/1983).

SUMMARY OF THE INVENTION

The object of the present invention is to provide a fiber reinforced metal composite material in which the thermal expansion coefficient is further reduced in addition to the merits of the fiber reinforced metal composite material, e.g., excellence in abrasion resistance, heat resistance and seizure resistance.

As a result of an earnest study, the present inventors have found that the thermal expansion coefficient of a composite material can be further lowered by combining alumina fibers or alumina-silica-type fibers which have excellent abrasion resistance, heat resistance and seizure resistance with hypereutectic aluminum-silicon-type alloys enriched in primary crystal silicon as hard particles.

DETAILED DESCRIPTION OF THE INVENTION

Figure 1:
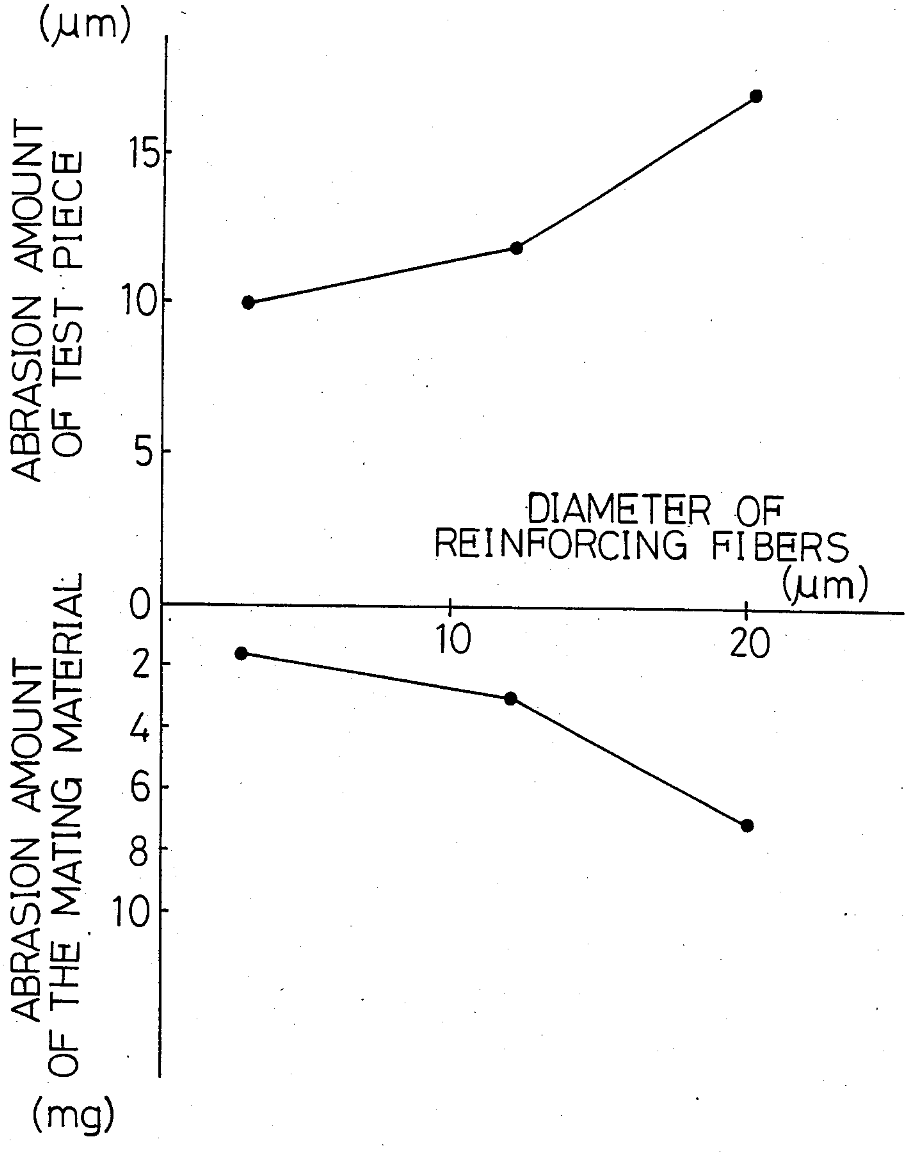
FIG. 1 shows the relationship between the diameter of reinforcing fibers and the amount of abrasion.

In this invention, alumina fibers or alumina-silica-type fibers with an average diameter of not more than 10 microns are used. Alumina fibers and alumina-silica-type fibers currently available can be employed. The alumina content in the alumina-silica-type fibers is preferably not less than 40% by weight. If the alumina content is less than 40% by weight, the heat resistant temperature of the reinforcing fibers is lowered and the reinforcing fibers may occasionally react with aluminum in the compositing step to degrade the reinforcing fibers. The alumina fibers or alumina-silica-type fibers are used in this invention because these fibers have excellent sliding characteristics such as abrasion resistance, heat resistance and seizure resistance, as well as because they are less degraded through reaction with the molten aluminum alloy. The average diameter for the alumina fibers or alumina-silica-type fibers is defined to be not more than 10 microns. If the average diameter is in excess of 10 microns, the desirable surface accuracy cannot be easily obtained, which reduces the sliding performance, increases the amount of abrasion and also lowers the machining properties. Short fibers are preferred for the alumina fibers or alumina-silica-type fibers. Short fibers as used in this invention are those fibers generally having a fiber length of from 0.1 to several tens millimeters, preferably from about 0.1 to 40.0 millimeters.

Alumina-silica-type fibers may contain various sizes of non-fibrous particles (shots). The content of the non-fibrous particles (shots) in the alumina-silica-type fibers is desirably not more than 17% by weight. Particularly, it is preferred that the content of the non-fibrous particles with a diameter of not less than 150 microns is not more than 7%.

The volume ratio of the reinforcing fibers preferably ranges from 5 to 15%. If the volume ratio is less than 5%, the reinforcing fiber is insufficient to suppress the thermal expansion coefficient and the thermal expansion suppressing effect is saturated. Machining properties are also significantly degraded. The volume ratio is defined as the ratio of the reinforcing fibers to the entire fiber reinforced metal composite material which is assumed to be 100 volume %.

The reinforcing fibers are preferably disposed in a two-dimensional random manner within a plane parallel to the direction in which suppression of the thermal expansion coefficient is desired. Further, a higher intraplane orientation rate is better and is preferably not less than 65%. If the orientation rate is less than 65%, sufficient suppression of the thermal expansion cannot be obtained. The intraplane orientation ratio as used herein means the degree of the reinforcing fibers oriented along the plane parallel to the direction along which the thermal expansion is suppressed. The intraplane orientation ratio is determined by dividing the number of reinforcing fibers having a 3 or greater aspect ratio, i.e., the ratio of the length to breadth of an elliptic cross section which crosses an optional plane in an area reinforced with the reinforcing fibers, by the total number of the fibers that cross the plane, and multiplying the divided quotient by 100. That is, the intraplane orientation rate is expressed as:

$$\frac{\text{Number of reinforcing fiber having an aspect of 3 or more}}{\text{Number of reinforcing fibers crossing an optional plane}} \times 100\ (\%)$$

The alumina fibers or alumina-silica-type fibers can be oriented in a two-dimensional random manner by using known methods. For instance, oriented fibers can be formed by dispersing the fibers in water, alcohol or other similar liquids and sucking the liquid under reduced pressure by forming of a vacuum. Alternatively, the fibers can be oriented by a pressurizing process for pressing the fibers contained within a mold from one direction by urging with a punch. The metal matrix used herein is a hyper-eutectic aluminum-silicon-type alloy enriched in primary crystal silicon which is hard grains. Hyper-eutectic aluminum-silicon-type alloys are preferred, for increasing the amount of the primary crystal silicon.

While the eutectic composition of aluminum-silicon-type alloy shows 11.6% silicon in the equilibrium state diagram, since silicon has a high tendency to become super-cooled, the actual eutectic point shifts toward the region of silicon to show about 14% silicon.

Accordingly, the aluminum-silicon-type alloy used in this invention preferably contains generally about 15 to 30% by weight of silicon. For instance, A-390 alloy containing about 17% silicon by weight can be used. The A-390 alloy comprises a composition of aluminum, 16–18% silicon and a small amount of magnesium. It is also preferable to increase the magnesium content further from that in the A-390 alloy. For instance, the amount of magnesium in the matrix can be from 0.5 to 0.8% by weight. The magnesium content is increased, because the alumina-silica-type fibers or alumina fibers are liable to react with magnesium and thereby reduce the magnesium content in the matrix and, therefore, the amount of magnesium is compensated for initially.

The particle size of the primary crystal silicon which is hard grains is preferably not more than 52 microns and, more preferably, not more than 40 microns in average particle size. The maximum particle size of the primary crystal silicon is desirably not more than 80 microns. The particle size of the primary crystal silicon is given as described above, because if the particle size of the primary crystal silicon is larger, cracking is liable to occur within the primary crystal silicon. If cracking occurs, the primary crystal silicon is liable to be broken and the cracked primary crystal silicon will bite into the sliding surface producing undesirable effects on the sliding movements. Further, if the particle size of the primary crystal silicon is larger, primary crystal silicon of larger particle sizes tend to surround the reinforcing fibers thereby causing cracking due to differences in the rigidity and heat expansion coefficients between the primary crystal silicon and the reinforcing fibers. Accordingly, it is desirable to minimize the particle size of the primary crystal silicon in order to suppress the cracking of the primary crystal silicon.

For reducing the particle size of the primary crystal silicon, it is desirable to employ a production process in which the molten aluminum-silicon-type alloy is impregnated to bring the alloy in contact with the fiber assembly, molded from reinforcing fibers into a predetermined configuration. Since the molten alloy is cooled in contact with the fibers, the primary crystal silicon can be prevented from growing coarser. The method of impregnating the molten alloy between the reinforcing fibers, as described above, can include conventionally employed processes such as the liquid metal forging cast process, the high pressure casting process and the molten alloy permeating process. The particle size of the primary crystal silicon generally depends on the cooling rate of the molten alloy and the particle size can be varied by adjusting variables such as the temperature of the molten alloy, the pre-heating temperature of the reinforcing fibers and the pressure of the molten alloy. For instance, if the pre-heating temperature of the reinforcing fibers is set to 400° C., the average particle size of the primary crystal silicon can be reduced to about 24 microns.

When using the liquid metal forging cast process or the high pressure casting process, since the molten alloy is impregnated between the reinforcing fibers while being under a pressure of from 200 to 1,000 kg/cm$^2$, it is desirable for the fiber assembly to have a sufficient strength to withstand the compressing force from the molten alloy. Accordingly, it is desirable for the fiber assembly to have a high compression strength of more than 0.2 kg/cm$^2$ and preferably, more than 0.5 kg/cm$^2$. For improving the compression strength of the fiber assembly, it is preferable to bond the reinforcing fibers with an inorganic binder that does not significantly lose its bonding strength even when in contact with the molten alloy at high temperature. The inorganic binder of this invention can include colloidal silica, colloidal alumina, water glass, cement and alumina phosphate solution. When using these binders, the fiber assembly is formed by dispersing the reinforcing fibers in the inorganic binder, stirring the liquid mixture, forming the assembly of the fibers from the reinforcing fibers in the liquid mixture through a vacuum forming process and then, drying or sintering them.

DETAILED DESCRIPTION OF THE PREFERRED EMBODIMENTS (1) The following tests were carried out for determining changes in the amount of abrasion due to the difference in the diameter of the reinforcing fibers. Specifically, alumina fibers were chopped into 1.5–3 mm lengths and dispersed in a colloidal silica as the inorganic binder, from which a fiber assembly of 0.2 g/cc bulk density was formed by way of a vacuum forming process. The diameter of the alumina fibers used included three types, that is, 3 microns, 12 microns and 20 microns. Accordingly, three types of fiber assemblies, i.e., those having reinforcing fibers of 3 micron diameter, 12 micron diameter and 20 micron diameter were formed, respectively. Then, molten alloy was immersed to bring it in contact with each of the fiber assemblies by way of the liquid metal forging cast process thereby forming fiber reinforced metal composite material. The composition of the molten alloy was aluminum containing 17% silicon, 4% copper and 8% magnesium. The molten alloy temperature was 790° C., the pre-heating temperature of the fiber assembly was 600° C. and the press force was 1,000 kg/cm$^2$, which was maintained until solidification. The fiber reinforced metal composite material thus formed contained primary crystal silicon with an average particle size of about 32–40 microns. Test pieces with dimensions of 6.35×10.16×15.7 mm were prepared from the thus formed fiber reinforcing metal composite material and an LFW-1 frictional abrasion test was effected for each test specimen. The test conditions employed in the frictional abrasion test were set as follows. The mating member was made of bearing steel JIS SUJ-2. The load was 60 kg, the test time was one hour, the rotational speed was 160 rpm and the lubricant oil was Castle motor oil 5W-30 which was being supplied during the test. The test results are shown in FIG. 1. As can be seen from FIG. 1, if the diameter of the alumina fibers was in excess of 10 microns, the abrasion of the mating material as well as that of the test piece itself increased significantly. In view of the above, it can be seen that the diameter of the reinforcing fibers is desirably not more than 10 microns in order to reduce the amount of abrasion.

Figure 2:
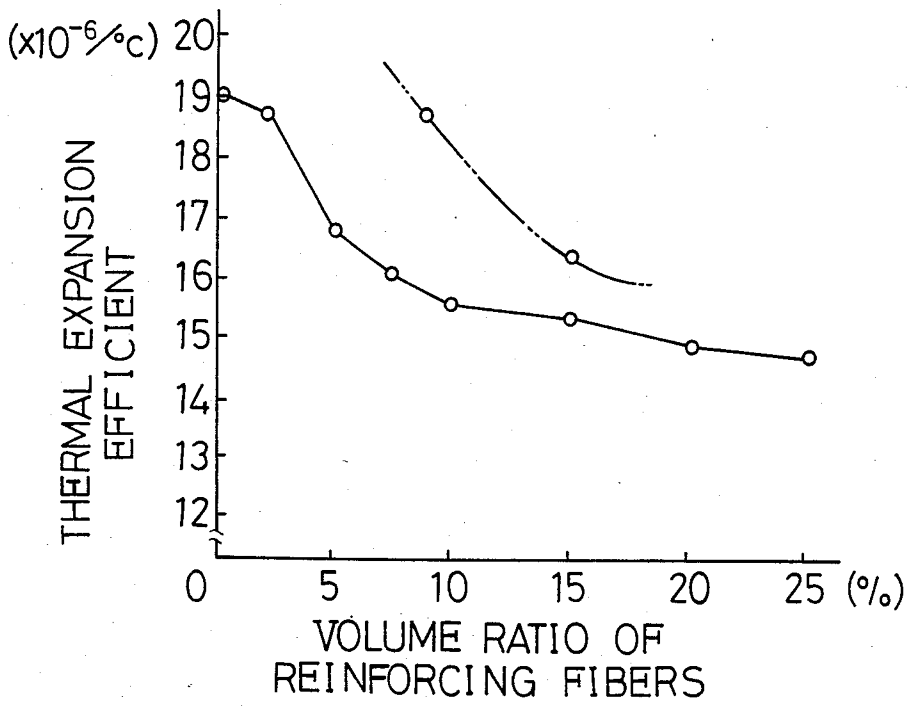
FIG. 2 is a graph showing the relationship between the volume ratio of the fibers and the thermal expansion coefficient.

(2) In order to examine the effect of the fiber volume ratio in the fiber reinforced metal composite material on the suppression of the thermal expansion, specimens of the fiber reinforced metal composite materials with fiber volume ratios of 2, 5, 7, 10, 15, 20 and 25% were formed respectively. The fiber assembly was formed by way of the vacuum forming process in cases where the fiber volume ratio was low and the fiber assembly was formed by way of the pressurizing molding process in cases where the fiber volume ratio was large. The composition of the molten alloy to be impregnated into the fiber assembly was Al-17%Si, 4% Cu, and 0.8% Mg. The molten alloy temperature was 790° C. and the preheating temperature of the fiber assembly was 600° C. Then, the thermal expansion coefficients of these test pieces were measured. The thermal expansion coefficient was measured by using a Dutronic Model II (manufactured by US Theater Co.) as the measuring apparatus and within a range from 40° C. to 200° C. with a heating rate of 1° C./min using $SiO_2$ (silica) as a standard specimen. The results are shown in FIG. 2. As can be seen from FIG. 2, there is no substantial suppression of the thermal expansion where the fiber volume ratio is 2%. However, there is a large suppression of the thermal expansion for a fiber volume ratio between 5% and 15%. Further, the thermal expansion suppressing effect is saturated if the fiber volume ratio exceeds 15%. Accordingly, it can be seen that a preferred range for the fiber volume ratio is from about 5 to 15%. In the aluminum-17% silicon-type alloy having substantially the same composition as that of the molten metal of the specimen described above, the thermal expansion coefficient is $19\times10^{-6}$/°C. This can be seen from the numerical values where the fiber volume ratio is 0% in FIG. 2. While on the other hand, in the fiber reinforced metal composite material disclosed in Japanese Patent Laid-Open No. 93,837/1983 in which AC8A is fiber reinforced, the thermal expansion coefficient varies with the fiber volume ratio as shown by the two-dot chain line in FIG. 2. The thermal expansion coefficient of the fiber of the reinforced metal composite material according to this invention is lower than that of the aluminum alloy containing 17% silicon and lower than that of the fiber reinforcing metal composite material as disclosed in Japanese Patent Laid-Open No. 93,837/1983. This is considered to be attributable to the interaction between the primary crystal silicon and the reinforcing fibers.

Figure 3:
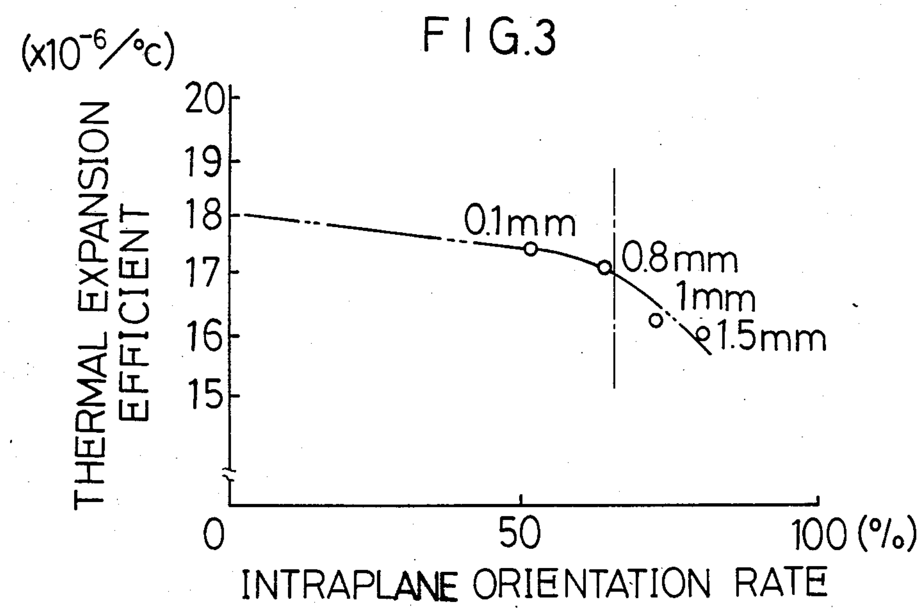
FIG. 3 is a graph showing the relationship between the intraplane orientation rate and the heat expansion coefficient.

(3) The effect of the orientation rate of the reinforcing fibers on the suppression of the thermal expansion was next examined. The intraplane orientation rate was varied by changing the length of the fibers while setting the fiber volume ratio in the fiber reinforced metal composite material to 7%. Specifically, test specimens with intraplane orientation rates of 52%, 64%, 72% and 85% were prepared by setting the fiber length to 0.1 mm, 0.8 mm, 1 mm and 1.5 mm, respectively. The experiment was carried out using molten metal with a composition. Al-17% Si-4% Cu-0.5% Mg by the liquid metal forging cast process under the same conditions as described above, i.e., setting the pressurizing force to 1,000 kg/cm$^2$, the pre-heating temperature of the fiber assembly to 600° C. and the temperature of the molten alloy to 790° C. Then, the thermal expansion coefficient in the orientating direction was measured. The thermal expansion coefficient was measured by the same method as described above. The results are shown in FIG. 3. As can be seen from FIG. 3, if the intraplane orientation rate exceeds 65%, the effect of suppressing the thermal expansion coefficient rapidly increases. Accordingly, it can be seen that the orientation rate within a plane is desirably more than 65% in order to suppress the thermal expansion.

(4) The effects of varying the particle size of the primary crystal silicon were examined next. In this case, Al-18% Si-4% Cu-0.5% Mg alloy was used as the hyper-eutectic aluminum-silicon-type alloy and the cooling velocity of the molten alloy is changed to vary the particle size of the primary crystal silicon by changing the forging cast conditions of the liquid metal forging cast process, for example, varying the pre-heating temperature for the reinforcing fibers or the molten alloy temperature. The specimens are referred to as test pieces A–D. The casting conditions and the particle size of the primary crystal silicon are shown in Table 1.

TABLE 1

| Test piece | Fiber pre-heating temperature | Molten alloy temperature | Average particle size of primary crystal Si | Maximum diameter of primary crystal Si |
|---|---|---|---|---|
| A | 400° C. | 790° C. | 24 microns | 35 microns |
| B | 700° C. | 790° C. | 37 microns | 43 microns |
| C | 900° C. | 790° C. | 52 microns | 78 microns |
| D | 900° C. | 900° C. | 63 microns | 95 microns |

Figure 4:
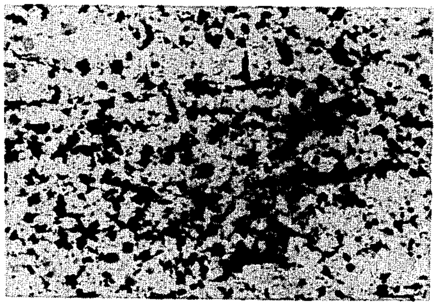
FIGS. 4, 5, 6 and 7 are microscopic photographs (×100) for the metal textures of fiber reinforced metal composite material in which the particle size of primary crystal silicon is changed.
Figure 5:
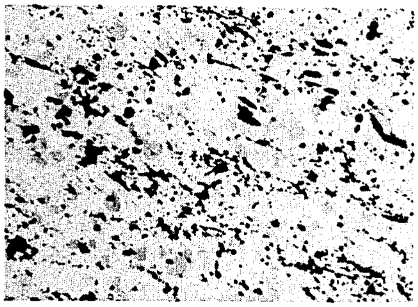
Figure 6:
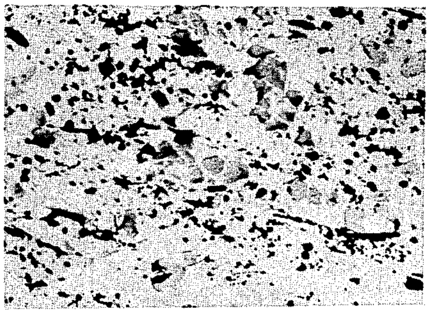
Figure 7:

Microscopic texture of photographs for test specimens A–D (×100) are shown in FIGS. 4, 5, 6 and 7, respectively. That is, test piece A is shown in FIG. 4, test piece B in FIG. 5, test piece C in FIG. 6, and test piece D in FIG. 7. In the microscopic textures shown in FIG. 4 through FIG. 7, large grey particle portions represent primary crystal silicon and black circular and elliptic portions represent reinforcing fibers. Sliding tests at a high surface pressure were carried out on the test specimens A–D. In the sliding test, the abrasion characteristics were examined by forming blocks each of 6.35×10.16×15.7 mm from the test specimens A–D, bringing a ring made of bearing steels SUJ-2 (35 mm outer diameter) into contact with the block under a load of 150 kg, and rotating the ring at 160 rpm for one hour in this state. In this case, Castle motor oil 5W-30 was continuously supplied as the lubricant oil during the test.

Figure 8:
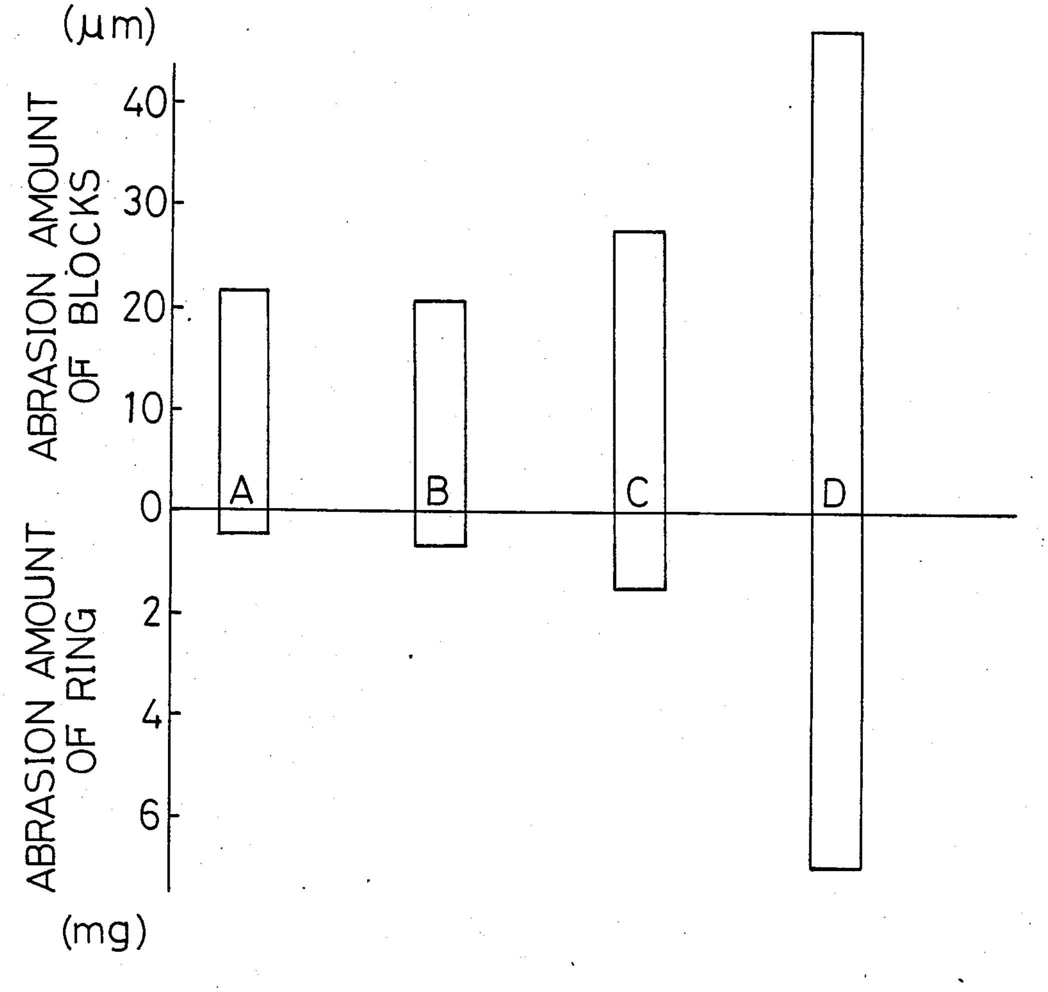
FIG. 8 is a graph showing the relationship between the particle size of the primary crystal silicon and the amount of abrasion.

The test results for the abrasion are shown in FIG. 8. As can be seen from FIG. 8, excess abrasion resulted in test piece D which had a primary crystal silicon of 63 microns average particle size. Furthermore, excess abrasion was also observed in the mating material of test piece D. While on the other hand, the abrasion was low in the test specimens A–C. Accordingly, as is apparent from FIG. 8, it is desirable to limit the particle size of primary crystal silicon to not more than about 60 microns in order to reduce the amount of abrasion. Furthermore, cracking in the primary crystal silicon was examined for each of the blocks after the sliding test. Cracking resulted in all of the case where the particle size of the primary crystal silicon was greater than 80 microns. Furthermore, cracking occurred in about 70% of primary crystal silicon for cases where the particle size of the eutectic silicon is 50–80 microns. It is considered that if the particle size of the primary crystal silicon is large, cracking is liable to occur in the primary crystal silicon, because the eutectic silicon tends to surround the reinforcing fibers thereby causing cracking of the primary crystal silicon due to the differences in the rigidity and thermal expansion between them.

APPLICATION EXAMPLE 1

Figure 9:
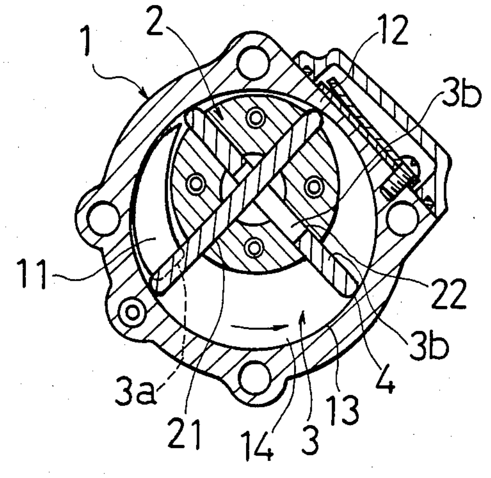
FIG. 9 is a cross sectional view showing a main portion of a through vane type compressor.
Figure 10:
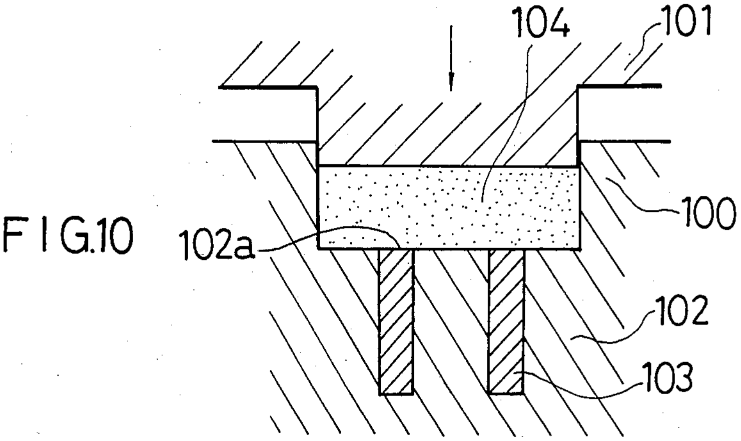
FIG. 10 is a schematic cross sectional view illustrating the step of forming the vane.

Application Example 1 shown in FIG. 9 illustrates the case where the fiber reinforced metal composite material according to this invention was applied to a vane of a rotary type compressor for use in an air conditioner.

In this example, alumina-silica-type fibers with an average diameter of 3 microns and a length of 1.0–2.5 mm (trade name Kaowool, manufactured by Isolight Bubcock Refractory Company) were removed with non-fibrous particles and mixed with a water soluble silica sol as an inorganic binder. Then, a plate-like fiber assembly of 40×70×10 mm dimensions was molded by way of a vacuum forming process. The fiber assembly had a bulk density of 0.18 g/cc and a fiber volume ratio of 7%. The fibers in the fiber assembly were oriented at random in a two-dimensional manner within a plane parallel to the direction in which the thermal exapansion is to be controlled, that is, within the plane of 40×70 mm, and the intraplane orientation rate was 85%. Then, the fiber assembly was pre-heated at 600° C. in an electrical oven. Fiber assembly 103 was then contained within cavity 102*a* of molding die 102 comprising main die 100 and upper die 101 to which was rapidly poured molten metal 104 of a hyper-eutectic aluminum-silicon-type alloy. The molten metal had a composition of Al-17% Si-4% Cu-0.8% Mg and a molten metal temperature of 790° C. Then, a pressure of 1,000 $kg/cm^2$ was applied and held until solidification of upper die 101 of molding die 102. The molten alloy contained a larger amount of magnesium than that in the usually employed A-390 alloy. The magnesium content is increased since the alumina-silica-type fibers and magnesium are liable to react with each other reducing the magnesium contained in the matrix at the stage of the heat treatment in the subsequent step. The fiber reinforced metal composite material prepared as described above was heat treated (T6), and then machined to a predetermined shape into vanes 3*a* and 3*b* as shown in FIG. 9. Vanes 3*a* and 3*b* had a thermal expansion coefficient of $16\times10^{-6}$/°C., which was lower than the thermal expansion coefficient of the usually employed A-390 alloy ($18-19\times10^{-6}$/°C.).

The compressor shown in FIG. 9 is a through vane type coolant compressor in which circular rotor 2 made of cast iron is rotatable disposed within circular main body 1 made of cast iron. Compression chamber 3 whose cross sectional area changes continuously is formed between the main body (1) and the rotor (2), and intake port 11 for sucking coolant from the side of the evaporator not illustrated is opened to a portion of the main body (1) corresponding to a protion where the volume of the compression chamber (3) is increased. Further, discharge port 12 for discharging the coolant is formed at a portion of the main body (1) corresponding to the portion where the volume of the compression chamber (3) is most decreased. Guide grooves 21 and 22 are formed in rotor 2 such that they penetrate in the diametrical direction and are perpendicular to each other. Vanes 3*a* and 3*b* are inserted slidably to the guide grooves (21 and 22 respectively). Accordingly, the liner portion 13 has a specific profile along which both ends of vanes 3*a* and 3*b* can always move slidingly. Further, the width of vanes 3*a* and 3*b* are formed substantially to the same size as the gap of liner side portion 14 forming both of the side walls of the compression chamber (3). When the compressor is operated, vanes 3*a* and 3*b* generate heat due to the sliding friction between the vanes (3*a,* 3*b*) and the liner portion (13) and due to the adiabatic compression of gases. Since the vanes (3*a,* 3*b*) are formed with the fiber reinforced metal composite material as described above in this example, the thermal expansion coefficient can be decreased to $16\times10^{-6}$/°C. Accordingly, the clearance between the vanes (3*a,* 3*b*) and the liner portion (13), and the clearance between the vanes (3*a,* 3*b*) and the liner side portion (14) can be decreased as compared with conventional vanes. Therefore, the size of the clearance can be narrowed by design as compared with the conventional vane. Accordingly, in the case of using vanes 3*a* and 3*b* of this embodiment, the volume efficiency of the compressor is from about 81 to 83%, which can be improved by about 3% as compared with the conventional volume efficiency of from 79 to 81%.

A duration test was effected for the compressor incorporating vanes 3*a* and 3*b* as described above. The duration test consited of (i) a continuous duration test, (ii) a liquid compression test and (iii) a gas lacking test. In this case, the continuous duration test was effected by continuously rotating the compressor for 100 hours. Further, the liquid compression test was carried out by liquefying the coolant and applying an impulsive load on it. The gas lacking test was effected while decreasing the amount of the coolant. Since the vanes (3*a,* 3*b*) were excellent in abrasion resistance, heat resistance and seizure resistance as described above, the test results were satisfactory for all of the tests.

Figure 11:
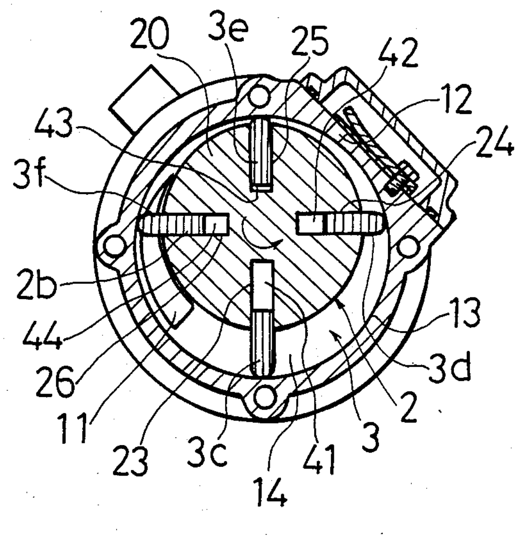
FIG. 11 is a cross sectional view of a main portion of a movable blade main compressor.

The fiber reinforced metal composite material can also be used as a vane for a movable blade vane compressor as shown in FIG. 11. Bottomed grooves 23, 24, 25, and 26 are formed radially to rotor 20 in a compressor as shown in FIG. 11, and vanes 3*c,* 3*d,* 3*e* and 3*f* are slidably inserted to the respetive grooves (23, 24, 25 and 26). Further, spaces 41, 42, 43 and 44 are formed between the bottom face for each of the vanes (3*c*–3*f*) and the bottom face for each of the grooves (23–26), such that compressed liquid from fluid channel 3 is introduced upon operation. The top ends of the vanes (3*c*–3*f*) are urged to the liner portion 13 with the pressure by the compressed liquid.

APPLICATION EXAMPLE 2

In the same manner as in Application Example 1, the fiber assembly with a bulk density of 0.5 g/cc and a fiber volume ratio of 14.3% was prepared by using alumina fibers (Saffaile made by ICI Co.) of 3 micron diameter and 1.5 mm length. The metal is melted and composited to the fiber assembly, thereby forming them into a vane component for use in a compressor. The molten metal alloy comprises an Al-18% Si-2% Cu-1% Mg - 1.5% Ni alloy. The molten metal temperature was set to 800° C. and the fiber assembly has a pre-heating temperature of 600° C. The vane component manufactured from the fiber reinforced metal composite material as described above has a heat expansion coefficient of $15.2\times10^{-6}$/°C. The vane material was then subjected to machining after the heat treatment, and the vane was incorporated into a rotary compressor as shown in FIG. 9, in the same manner as in Application Example 1. In this case, the volume efficiency of the compressor can also be improved by 5%. Satisfactory results are also obtained with the continuous duration test, the liquid compression test and the gas lacking test as described above.

Obviously, numerous modifications and variations of the present invention are possible in light of the above teachings. It is therefore to be understood that within the scope of the appended claims, the invention may be practiced otherwise than as specifically described herein.

What is claimed is:

1. A fiber reinforced metal composite material having a metal matrix and reinforcing fibers in a volume ratio of t 5 to 15% embedded in said matrix, wherein said reinforcing fibers consist essentially of at least one member selected from the group consisting of alumina fibers and alumina-silica-type fibers with an average diameter of less than 10 microns, and said matrix consists essentially of a hypereutectic aluminum-silicon-type alloy containing silicon in an amount of 13 to 30 wt. % in which primary crystal silicon is dispersed.

2. The fiber reinforced metal composite material of claim 1, wherein said reinforcing fibers are disposed in a two-dimensional random manner within a plane parallel to the direction of suppression of the thermal expansion coefficient, and the intraplane orientation rate in said plane is not less than 65%.

3. The fiber reinforced metal composite material of claim 1, wherein the average particle size of said primary crystal silicon is not more than 52 microns.

4. The fiber reinforced metal composite material of claim 1, wherein the maximum particle size of said primary crystal silicon is not more than 80 microns.

5. The fiber reinforced metal composite material of claim 1, wherein the fiber length of said alumina-silica-type fibers is from 0.1 to several tens millimeter.

6. A vane, rotor, swash plate or liner of a compressor made from the fiber reinforced metal composite material of claim 1.

* * * * *